United States Patent

Harris

[15] 3,701,555

[45] Oct. 31, 1972

[54] CLAMP
[72] Inventor: Kenneth D. Harris, 108 Windward, Euless, Tex. 76039
[22] Filed: Nov. 24, 1969
[21] Appl. No.: 879,382

Related U.S. Application Data

[63] Continuation-in-part of Ser. No. 654,522, July 19, 1967.

[52] U.S. Cl. .................287/110, 52/726, 287/111
[51] Int. Cl. ..................................................F16b 2/14
[58] Field of Search.................52/726, 731, 732, 733; 287/110, 114, 111

[56] References Cited

UNITED STATES PATENTS

| | | | |
|---|---|---|---|
| 1,689,281 | 10/1928 | Forssell | 52/726 X |
| 3,340,667 | 9/1967 | Reiland | 52/726 X |
| 719,817 | 2/1903 | Kunze | 287/108 X |
| 1,098,287 | 5/1914 | Moon | 287/108 X |
| 2,874,812 | 2/1959 | Clevett | 52/726 X |
| 3,288,489 | 11/1966 | Jahn | 52/726 X |
| 3,480,309 | 11/1969 | Harris | 287/110 |

Primary Examiner—David J. Williamowsky
Assistant Examiner—Wayne L. Shedd
Attorney—Walter J. Jagmin

[57] ABSTRACT

A clamp for securing adjacent ends of longitudinally aligned reinforcing bars of concrete structures which includes a tubular longitudinally split sleeve and a contracting member for pulling the ends of the tubular sleeve toward one another to contract the sleeve radially into firm gripping engagement with adjacent end portions of the reinforcing bars which are telescoped into opposite ends of the sleeve, the sleeve having internal support means intermediate its ends for holding the sleeve in a predetermined position on one of the reinforcing bars.

6 Claims, 7 Drawing Figures

PATENTED OCT 31 1972 3,701,555

INVENTOR
Kenneth D. Harris
BY
Walter J. Jagmin
ATTORNEY

CLAMP

This application is a continuation-in-part of co-pending application, Ser. No. 654,522 filed July 19, 1967.

This invention relates to clamps and more particularly to clamps for securing elongate members to one another in axially aligned relationship.

An object of this invention is to provide a new and improved clamp for securing adjacent end portions of two elongate members, such as the reinforcing rods of concrete structures, which includes a longitudinally split sleeve into whose opposite end portions are telescopical the adjacent end portions of a pair of elongate members of the reinforcing bars, and a contractor for drawing the longitudinal ends of the sleeve toward one another to contract the sleeve throughout its length into constricting gripping engagement with the portions of the bars telescoped in opposite ends of the sleeve.

Another object is to provide a clamp whose sleeve is provided with internal support engageable with the end surface of one of the reinforcing bars to position and hold the sleeve in predetermined position relative to the bars during the insertion of the other bar into the sleeve and during the driving of the contractor over a wedge portion of the sleeve.

Still another object is to provide a clamp of the type described wherein the support means comprises a planar member extending the sleeve and having opposite end tabs extending through aligned slots in the sleeve to permit contraction of the sleeve about reinforcing bars telescoped into opposite ends of the sleeve.

Still another object is to provide a clamp wherein the support means ensures that adjacent end portions of the bars of substantially equal lengths are telescoped into opposite ends of the sleeve.

A further object is to provide a clamp of the type described which will hold a pair of reinforcing rods in vertical alignment and transmit compression forces from the top bar to the top planar surface of the bottom bar.

An important object of the invention is to provide a clamp whose sleeve does not have to be supported by external means after it has been telescoped over the top end of the lower bar thus permitting the operator to use both hands to manipulate the contractor and the top bar.

Briefly stated, the invention relates to a clamp for securing to one another a pair of vertically extending members, such as steel reinforcing bars, which has a radially contractable tubular member having a longitudinal passage into whose opposite ends the elongate members are telescopical the tubular member having a longitudinal opening or slit to facilitate its radial contraction into constricting gripping engagement with the end portions of the bars positioned therein, and support means in the passage of the tubular member intermediate its ends and connected to the tubular member against longitudinal movement in the passage, the support means limiting the telescopical movement of the tubular member over an elongate member whereby the tubular member may be supported in vertical position in proper relation to, and on one end of, an elongate member while the other elongate member is being inserted therein and during the contraction of the member into constricting gripping engagement with the end portions of the elongate members telescoped in opposite end portions thereof.

Additional objects and advantages of the invention will be readily apparent from the reading of the following description of a device constructed in accordance with the invention, and reference to the accompanying drawings thereof, wherein.

Figure 1:
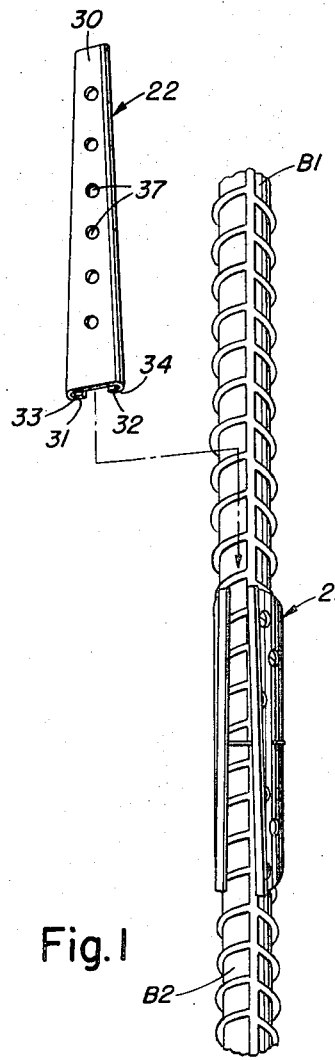
FIG. 1 is an exploded perspective view of the clamp embodying the invention showing the sleeve disposed in position to clamp the adjacent ends of two reinforcing bars to one another.
Figure 2:
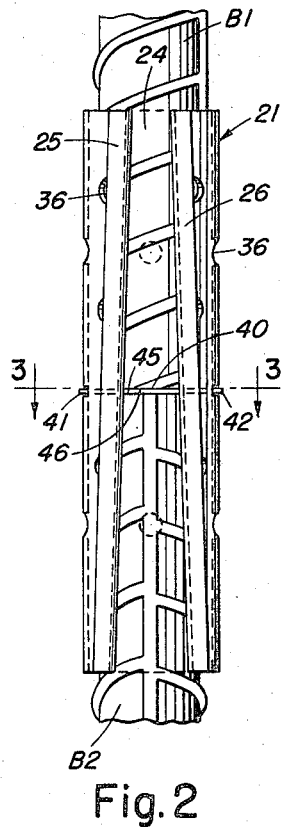
FIG. 2 is a front view of the sleeve of the clamp or a pair of reinforcing bars.
Figure 4:
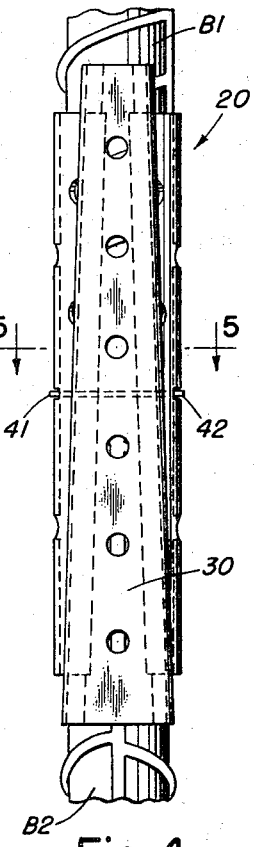
FIG. 4 is a view similar to FIG. 2 of the clamp with the sleeve held in contracted condition by the contractor.
Figure 3:
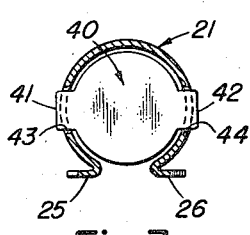
FIG. 3 is a vertical sectional view taken on line 3—3 of FIG. 2.
Figure 5:
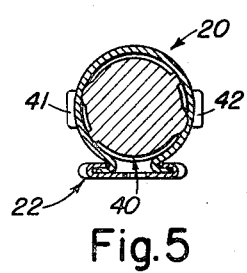
FIG. 5 is a sectional view taken on line 5—5 of FIG. 4.

Referring now particularly to FIGS. 1 through 5 of the drawings, the clamp 20 embodying the invention includes a tubular sleeve 21 which is formed of steel or other suitable somewhat resilient or flexible substance and a contractor 22 for the sleeve. The sleeve 21 is split longitudinally to provide an opening 24 extending the full length of the sleeve. The marginal edge portions of the sleeve are turned outwardly in opposite directions to provide longitudinally extending wedge flanges 25 and 26 on opposite sides of the longitudinal opening. The width of the opening increases progressively downwardly throughout its length so that the wedge flanges 25 and 26 diverge downwardly.

The sleeve contractor 22 comprises a flat plate 30 having diverging side edge portions which are bent inwardly toward one another to form hook flanges 31 and 32 which define grooves 33 and 34, respectively in which are receivable the wedge flanges 25 and 26, respectively, of the sleeve.

It will be apparent, due to the downward divergence of the wedge flanges 25 and 26 and of the hook flanges 31 and 32 of the contracting member 30, which with the flat plate provide the inwardly opening grooves 33 and 34, that as the lower end of the contractor is moved downwardly relative to the sleeve with the flanges 25 and 26 being received in the grooves 33 and 34, respectively, the sleeve is contracted radially to firmly grip and engage the external ribs and of the adjacent end portions of the reinforcing bars B1 and B2 which are telescoped into the lower and upper end portions of the sleeve 21. The sleeve and the contractor are provided with a plurality of spaced apertures 36 and 37, respectively, to permit concrete to flow into the sleeve and between the sleeve and the reinforcing bars during the construction of a structural member, such as column, which is reinforced by vertical reinforcing bars connected by the clamps at their adjacent ends. The structure of the contractor and the sleeve thus far described is similar to the structure of similar clamps disclosed in the patents to F. D. Reiland, U.S. Pat. Nos. 3,245,189 and 3,245,190.

The sleeve 21 of the clamp 20 embodying the invention differs from that of the clamps disclosed in the patents to Reiland in having a support means 40 for engaging the planar top end surface 38 of the lower reinforcing rod B1 to properly position the sleeve on the lower rod so that approximately half its length is telescoped over the lower bar and to hold the sleeve against displacement during the telescoping of the top bar B2 into the upper portion of the sleeve and during the driving of the contractor 30 downwardly relative to the sleeve to contract the sleeve into firm clamping or gripping engagement with the ribs of the reinforcing rods. The support means, i.e., the disk 40, is located substantially at the middle of the length of the sleeve so that the sleeve will have equal longitudinal portions thereof engageable with the adjacent end portions of equal lengths of the upper and lower bars which are telescoped into opposite ends of the sleeve and secured together by the clamp.

The disk 40 has diametrically opposed extensions or arms 41 and 42 which extend outwardly through slots 43 and 44, respectively, of the sleeve. The diameter of the disk is smaller than the internal diameter of the sleeve when it is in its contracted clamping position about the end portions of the bars which are telescoped into its opposite end portions to permit radial contraction of the sleeve.

When the clamp 20 is to be used to secure the adjacent end portions of two vertical bars B1 and B2 together to hold them in axial alignment, the lower portion of the sleeve 21 is telescoped over the upper end portion of the lower bar B1 until the bottom surface of disk 40 rests on the top surface 45 of the lower bar. The sleeve will now be held on the lower bar by gravity and cannot be dislodged laterally off the bar because the width of its longitudinal opening 24 is smaller than the diameter of the bar. The workman therefore does not have to use any other means to hold the sleeve on the lower bar during subsequent operations as is the case with conventional clamp sleeves which are not provided with such internal support means, it being the practice to secure a pipe wrench to the lower bar to position properly the conventional clamp sleeve on the lower bar and hold it against downward movement. The lower end of the top bar B2 is then telescoped into the upper end of the sleeve until its bottom flat surface 46, which extends perpendicularly to its longitudinal axis, rests on the top surface of the disk 40. The lower end of the contractor 22 is then moved into alignment with the edge flanges 25 and 26 of the sleeve 21 and is then moved downwardly, the wedge flanges 25 and 26 entering into the grooves 33 and 34. The wedge member is driven downwardly on the sleeve by hammer blows applied to its upper end and radially contracts the sleeve throughout its length during this downward movement. During the driving of the contracting member 30 over the wedge flanges 25 and 26, there is no necessity to hold the sleeve against downward movement since the support means 40 prevents downward movement of the sleeve on the lower bar B2. The bars are then held tightly in vertical longitudinal alignment and the bars and the stop members form a substantially vertical solid column. The constricting clamping action of the sleeve on the end portions of the bars telescoped therein helps move the upper bar into axial alignment with the lower bar and, due to the flexibility or resilience of the substance of which it is formed, conforms to the configuration of the bar and thereby compensates for variations in the diameters and the external contours of the bars.

It will be apparent that the disk 40 provides relatively large areas of contact with the planar end surfaces 45 and 46 of the bars B1 and B2, respectively, and the bars and disk thus constitute a solid column for the transmittal of vertical compressional forces.

It will be apparent that the operator need not take any pains to position the sleeve on the two bars or to support the sleeve which results in great saving of time and labor especially in relatively inaccessible locations since the sleeve is properly positioned and supported by means of the disk 40 on the top end of the lower reinforcing bar while the upper bar is telescoped into the upper end portion of the sleeve and while the sleeve contractor is driven downwardly over the wedge flanges of the sleeve.

It will further be seen that the provision of the disk located at the central plane of the sleeve insures that end portions of equal length of the two reinforcing bars are engaged and clamped by the sleeve.

Figure 6:
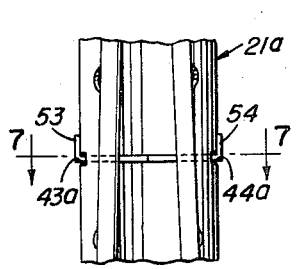
FIG. 6 is a fragmentary front view of another clamp embodying the invention; and, FIG. 7 is a sectional view taken on line 7—7 of FIG. 6.
Figure 7:
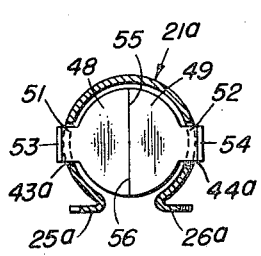

Referring now particularly to FIGS. 6 and 7 of the drawings, the sleeve 21a is similar to the sleeve 21 and its elements are provided with the same reference numerals, to which subscript *a* has been added, as the corresponding elements of the sleeve 21. The support 40 includes separate semi-circular members 48 and 49 provided with extensions 51 and 52, respectively which extend slidably through slots 43a and 442, respectively, of the sleeve 21a located at its central plane. The extensions 51 and 52 have up turned arms 53 and 54, respectively, which are adapted to engage the external surfaces of the sleeve above the slots to prevent dislodgement of the members from the sleeve. Thus the semi-circular members, which may be regarded as sections of a disk, function in the same manner as the disk 40 and are of course of such dimensions as to permit radial contraction of the sleeve 21a about reinforcing bars telescoped into its opposite ends by a contractor 30 in the same manner as the sleeve 21.

It will now be seen that the sleeve of the clamp embodying the invention has support means for positioning and holding the sleeve in proper relation to the bars which are telescoped into its opposite ends so that each bar will be secured by the sleeve throughout substantially the same length as the other, and that the support means provide for direct transmission of compressional forces from the upper bar to the lower bar since they are planar in configuration and are abutted by substantial areas of the planar end surfaces of the two bars.

It will be apparent that extensions 51 and 52 of the members 48 and 49 may be made sufficiently long that their inner edges 55 and 56 may actually be in contact when the sleeve is in its initial expanded condition so that the tabs do not have to slide toward one another between the end surfaces of the bars as the sleeve is contracted.

It will also be apparent that, if desired, the extensions 41 and 42 of the disk 40 of the sleeve 21 may also be provided exteriorly of the sleeve with arms which extend parallel to the longitudinal axis and either upwardly or downwardly to hold the planar member in centered position in the sleeve when it is in its expanded position.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A clamp for securing to one another adjacent end end portions of a pair of longitudinally aligned reinforcing bars having planar end surfaces, said clamp including: a radially contractible sleeve having a longitudinal passage, said sleeve having a pair of diametrically opposed and longitudinally substantially centrally located slots; a substantially circular planar support means disposed in said sleeve and having a pair of extensions extending radially outwardly and movably in opposite directions through said slots of said sleeve whereby said support means is located at substantially the middle of said sleeve, said support means extending perpendicularly to the longitudinal axis of said passage over a major portion of the cross sectional area of said passage and having oppositely facing planar surfaces engageable with planar end surfaces of aligned reinforcing bars telescoped in opposite ends of said sleeve, said sleeve having a longitudinal opening to facilitate radial contraction thereof, said sleeve being provided along opposite edges of the opening with outwardly turned wedge flanges which diverge longitudinally from each other to constitute wedge means; and a contractor having internal flanges for engaging substantially the entire length of said wedge flanges of said sleeve and for radially contracting said sleeve into constricting, gripping engagement with adjacent end portions of reinforcing bars positionable in opposite end portions of said sleeve upon longitudinal movement of said contractor relative to said sleeve.

2. The clamp of claim 1, wherein the diameter of said support means is smaller than the internal diameter of the sleeve when said sleeve is in its contracted gripping position about the end portions of the bars which are telescoped in its opposite end portions.

3. The clamp of claim 2, wherein said support means comprises a substantially circular disk.

4. The clamp of claim 2, wherein said support means comprises a pair of semi-circular planar sections.

5. The clamp of claim 4 wherein said extensions are provided at their outer ends with arms which extend longitudinally relative to and exteriorly of said sleeve.

6. The clamp of claim 1, wherein said extensions are provided at their outer ends with arms which extend longitudinally relative to and exteriorly of said sleeve.

* * * * *